United States Patent [19]

Kim

[11] Patent Number: 5,684,369

[45] Date of Patent: Nov. 4, 1997

[54] TOOL CHANGE APPARATUS FOR CHANGING THE TOOLS OF A MACHINING CENTER

[75] Inventor: Dongyoon Kim, Kyungsangnam-do, Rep. of Korea

[73] Assignee: Hyundai Motor Company, Seoul, Rep. of Korea

[21] Appl. No.: 535,730

[22] Filed: Sep. 28, 1995

[30] Foreign Application Priority Data

Sep. 29, 1994 [KR] Rep. of Korea ............... 94-24822

[51] Int. Cl.$^6$ ............................................. H02K 7/00
[52] U.S. Cl. .......................... 318/3; 468/44; 468/49
[58] Field of Search ..................... 315/569, 3.9; 29/568, 29/26 A, 26 R; 483/30, 36–57

[56] References Cited

U.S. PATENT DOCUMENTS

| | | | |
|---|---|---|---|
| 3,844,028 | 10/1974 | Hague | 483/49 |
| 4,141,133 | 2/1979 | Grinage | 483/9 |
| 4,198,885 | 4/1980 | Grinage | 82/24 R |
| 4,799,308 | 1/1989 | Kitamura | 483/41 |
| 4,817,267 | 4/1989 | Hitomi | 29/568 |
| 4,833,772 | 5/1989 | Kobayashi et al. | 29/568 |
| 4,835,838 | 6/1989 | Hirose | 483/47 |
| 4,884,332 | 12/1989 | Ozaka et al. | 483/44 |
| 4,955,127 | 9/1990 | Suda et al. | 483/54 |
| 5,129,140 | 7/1992 | Yan et al. | 483/45 |
| 5,134,767 | 8/1992 | Yasuda | 483/7 |
| 5,165,204 | 11/1992 | Luedeke et al. | 51/145 T |
| 5,350,347 | 9/1994 | Fujiwara et al. | 483/28 |

FOREIGN PATENT DOCUMENTS 93-24419 5/1993 Japan.

*Primary Examiner*—David S. Martin
*Attorney, Agent, or Firm*—Finnegan, Henderson, Farabow, Garrett & Dunner, L.L.P.

[57] ABSTRACT

Disclosed is a tool change apparatus for changing the tools of a machining center, which includes a frame for mounting the tool change apparatus, a cam follower device, a cylindrically shaped moveable member fixedly connected with the cam follower device for moving a clamp device fixedly attached to the free end of the moveable member, a first cylindrically shaped cam rotatably mounted on a shaft mounted on the frame, a second cylindrically shaped cam fixedly mounted on the frame, a drive gear device for rotating the first cam, a drive cam groove formed in the side surface of the first cam for driving the cam follower device, and a guide cam groove formed in the side surface of the second cam for guiding the cam follower. The first cam is snugly fitted into the second cam which snugly fitted into the moveable member, and the drive and guide cam grooves cooperate to move the cam follower and the moveable member to a position for changing the tools when the first cam is rotated in a direction.

4 Claims, 4 Drawing Sheets

TOOL CHANGE APPARATUS FOR CHANGING THE TOOLS OF A MACHINING CENTER

BACKGROUND OF THE INVENTION

(1) Field of the Invention

The present invention concerns a tool change apparatus for changing the tools of a machining center.

(2) Description of the Prior Art

Generally, a numerically controlled machine tool includes a machining center with a tool change apparatus. Such machining center is classified as vertical or horizontal type according to spindle direction. The machining center is designed to rotate when changing the tools.

Japanese Utility Model Publication No. 93-24429 discloses a tool change apparatus for changing the tools of a machining center, which requires separate drive mechanisms to make both linear and rotational motion, thus complicating the structure and causing operational instability.

SUMMARY OF THE INVENTION

It is an object of the present invention to provide a tool change apparatus for changing the tools of a machining center, which uses a single drive mechanism to make both linear and rotational motion.

It is another object of the present invention to provide a means for using a tool change apparatus for changing the tools of a machining center as both vertical and horizontal type.

According to one aspect of the present invention, a tool change apparatus for changing the tools of a machining center includes a frame for mounting the tool change apparatus, a cam follower, and a cylindrically shaped moveable member fixedly connected with the cam follower for moving a clamp assembly fixedly attached to the free end of the moveable member. The tool change apparatus also includes a first cylindrically shaped cam rotatably mounted on a shaft mounted on the frame, a second cylindrically shaped cam fixedly mounted on the frame, a drive means for rotating the first cam, a drive cam groove formed in the side surface of the first cam for driving the cam follower, and a guide cam groove formed in the side surface of the second cam for guiding the cam follower, wherein the first cam is snugly fitted into the second cam which in turn is snugly fitted into the moveable member, and the drive and guide cam grooves are designed to cooperate to move the cam follower and the moveable member to a position for changing the tools when the first cam is rotated in a direction.

According to one aspect of the present invention, the drive cam groove consists of two oblique branches formed slantingly with respect to the direction of the shaft and communicating at a connecting point near the front end of the first cam toward the direction of the clamp assembly. In addition, the guide cam groove consists of two horizontal branches, which are formed in parallel with the shaft and connected with each other via a vertical branch formed in the vertical direction with respect to the shaft. The vertical branch meets with the connecting point. The vertical branch has a length being half the circular perimeter of the second cam, so that when the cam follower is guided from the upper end to the lower end of the vertical branch, the moveable member is rotated by 180° and thus the clamp assembly.

According to another aspect of the present invention, the cam follower consists of a pin inserted in the drive and guide cam grooves, a ring-shaped block for fixedly connecting the moveable member with one end part of the pin, and a pair of rollers for surrounding the other end part of the pin. The rollers are respectively positioned in the drive and guide grooves so as to help the movement of the pin in the grooves.

The present invention will now be described with reference to the drawings attached only by way of example.

DETAILED DESCRIPTION OF THE PREFERRED EMBODIMENTS

Figure 1:
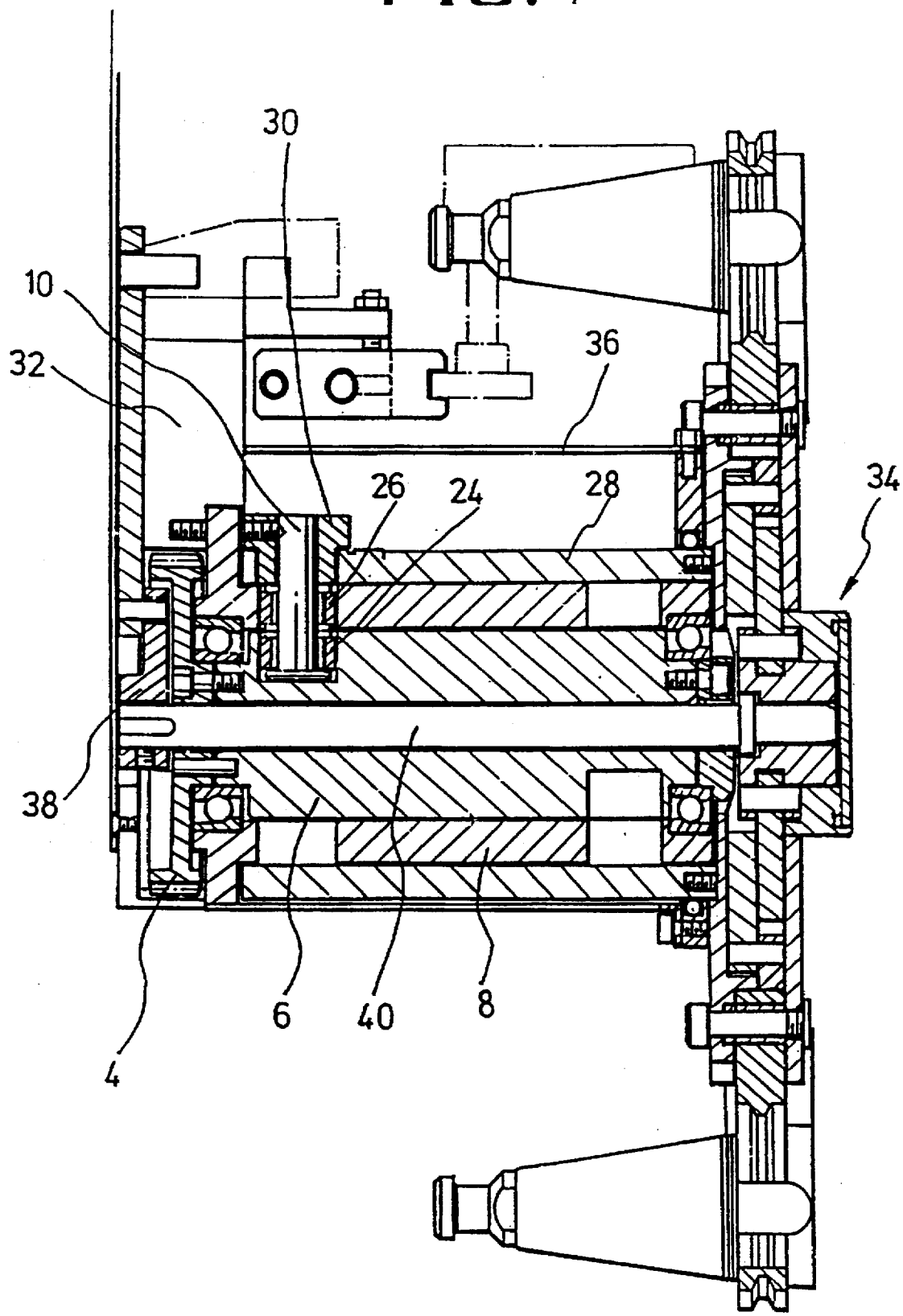
FIG. 1 is a side cross sectional view for schematically illustrating a tool change apparatus for changing the tools of a machining center according to an embodiment of the present invention.
Figure 3:
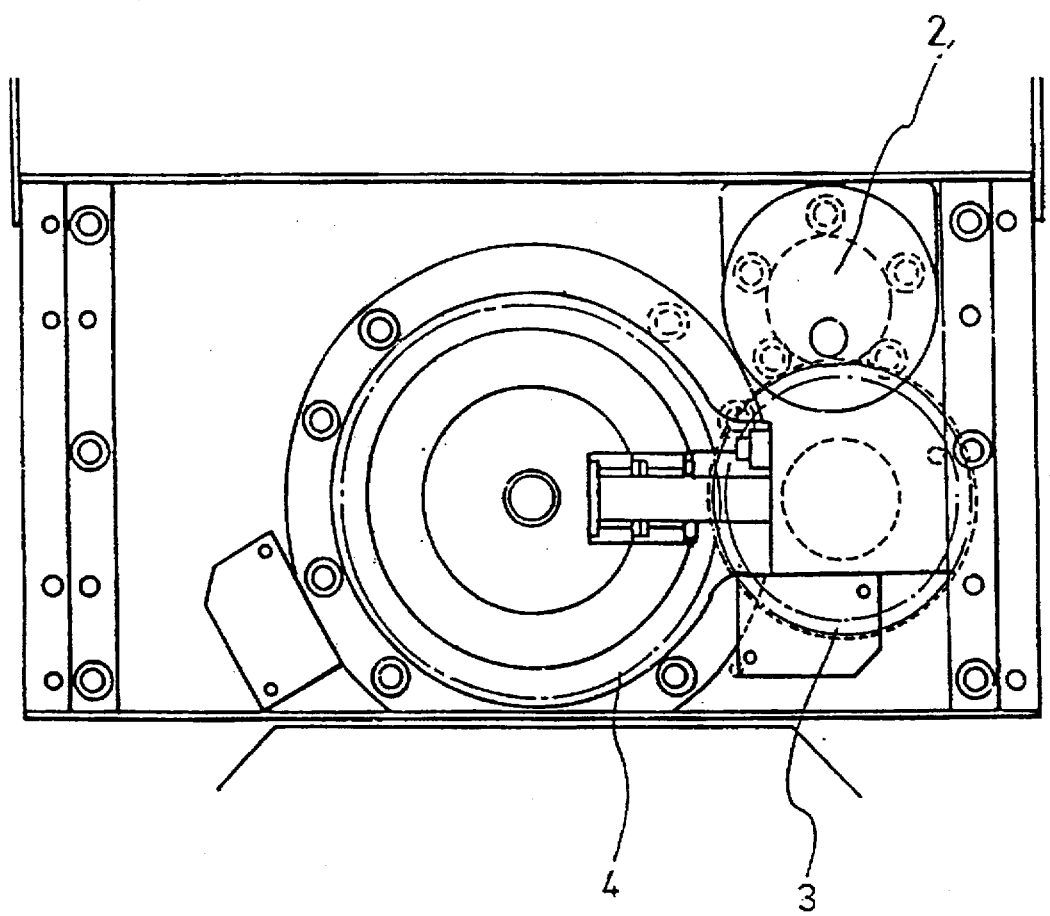
FIG. 3 is a plan view of the drive means for working the cylindrical cams of the inventive tool change apparatus shown in FIG. 1.

Referring to FIGS. 1 and 3, a tool change apparatus for changing the tools of a machining center comprises a frame 32 for mounting the tool change apparatus, a clamp device 34, and a clamp drive structure 2, 3, 4, 6, 8, 10, 28 for driving the clamp device.

The clamp drive structure includes a cam follower device 10, 30, a cylindrically shaped moveable member 28, a first cylindrically shaped cam 6, a second cylindrically shaped cam 8, and a gear device 2, 3, 4. The cam follower device consists of a pin 10, a ring-shaped block 30 for fixedly connecting the moveable member 28 with one end part of the pin 10, and a pair of rollers 24, 26 for surrounding the other end part of the pin 10. At the free end of the moveable member is fixedly attached the clamp device 34.

The first cam 6 is rotatably mounted on a shaft 40 mounted on the frame. The second cam 8 is fixedly mounted on the frame. The gear device includes a drive gear 2 of a hydraulic motor, and a driven gear 4 for receiving the rotational motion of the drive gear 2 via an idle gear 3.

Figure 2:
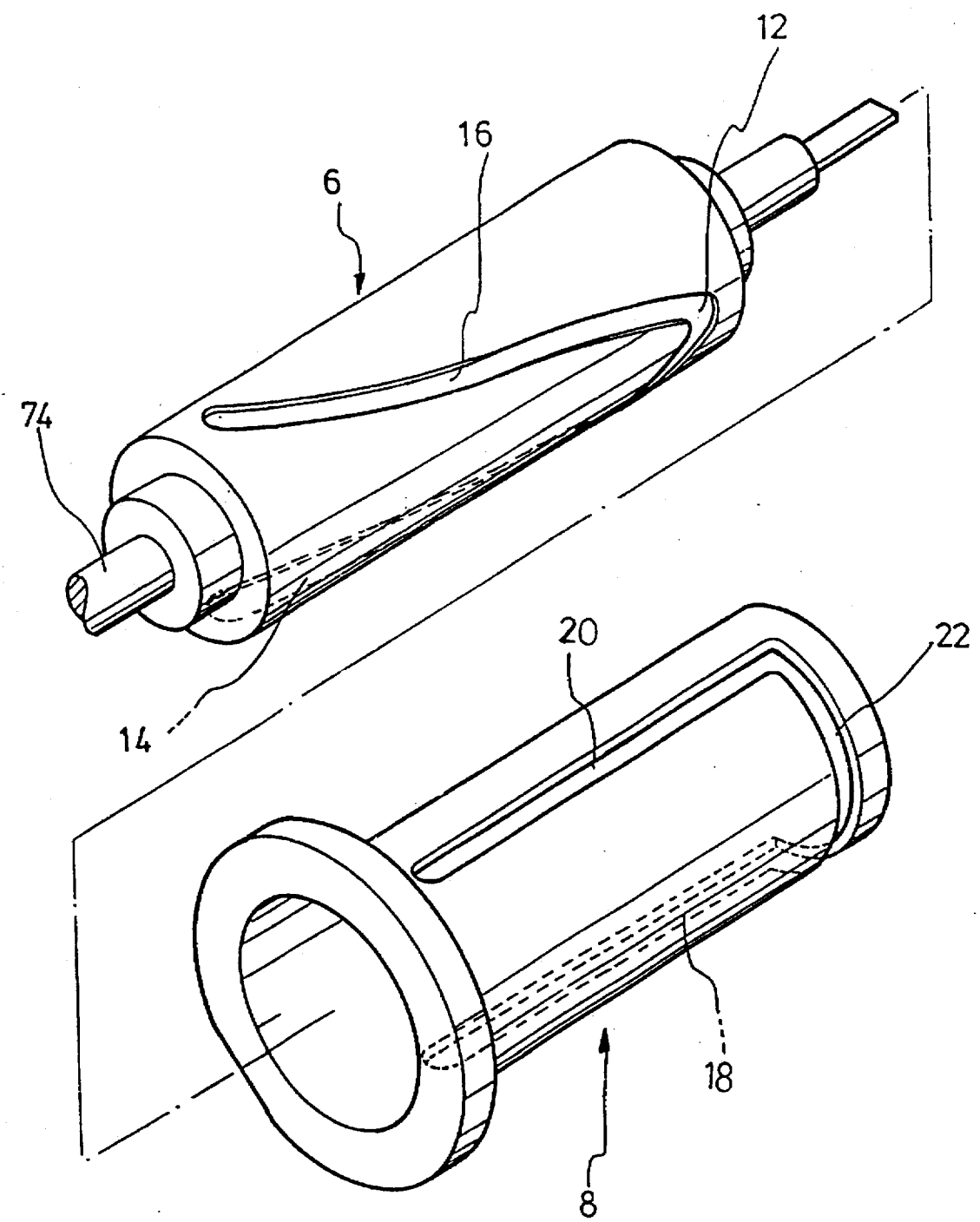
FIG. 2 is an exploded view of the cylindrical cams used in the tool change apparatus shown in FIG. 1.

As shown in FIG. 2, the first cam 6 has a drive cam groove 12, 14, 16 formed in its side surface to drive the cam follower device. The second cam 8 has a guide cam groove 18, 20, 22 formed in its side surface to guide the cam follower device. The first cam 6, second cam 8, and moveable member 28 are coaxially and snugly assembled together. Namely, the first cam 6 is snugly fitted into the second cam 8, which in turn is snugly fitted into the moveable member 28.

The drive cam groove consists of two oblique branches 14, 16, which are formed slantingly with respect to the direction of the shaft 40 and communicating at a connecting point 12 near the front end of the first cam 6 toward the direction of the clamp device 34. In addition, the guide cam groove consists of two horizontal branches 18, 20, which are formed in parallel with the shaft 40 and connected with each other via a vertical branch 22 formed in the vertical direction with respect to the shaft 40. The vertical branch 22 meets with the connecting point 12 of the drive cam groove of the first cam 6. The vertical branch 22 has a length being half the circular perimeter of the second cam 8.

The drive and guide cam grooves are designed to cooperate to move the cam follower device and thus the moveable member 28 to a position for changing the tools when the first cam 6 is rotated by the gear device in a direction. When the first cam 6, second cam 8, and moveable member 28 are assembled together, the pin 10 of the cam follower device is inserted in the drive and guide cam grooves with the rollers 24 and 26 being respectively positioned in the drive and guide grooves so as to help the movement of the pin 10 in the grooves.

Figure 4:
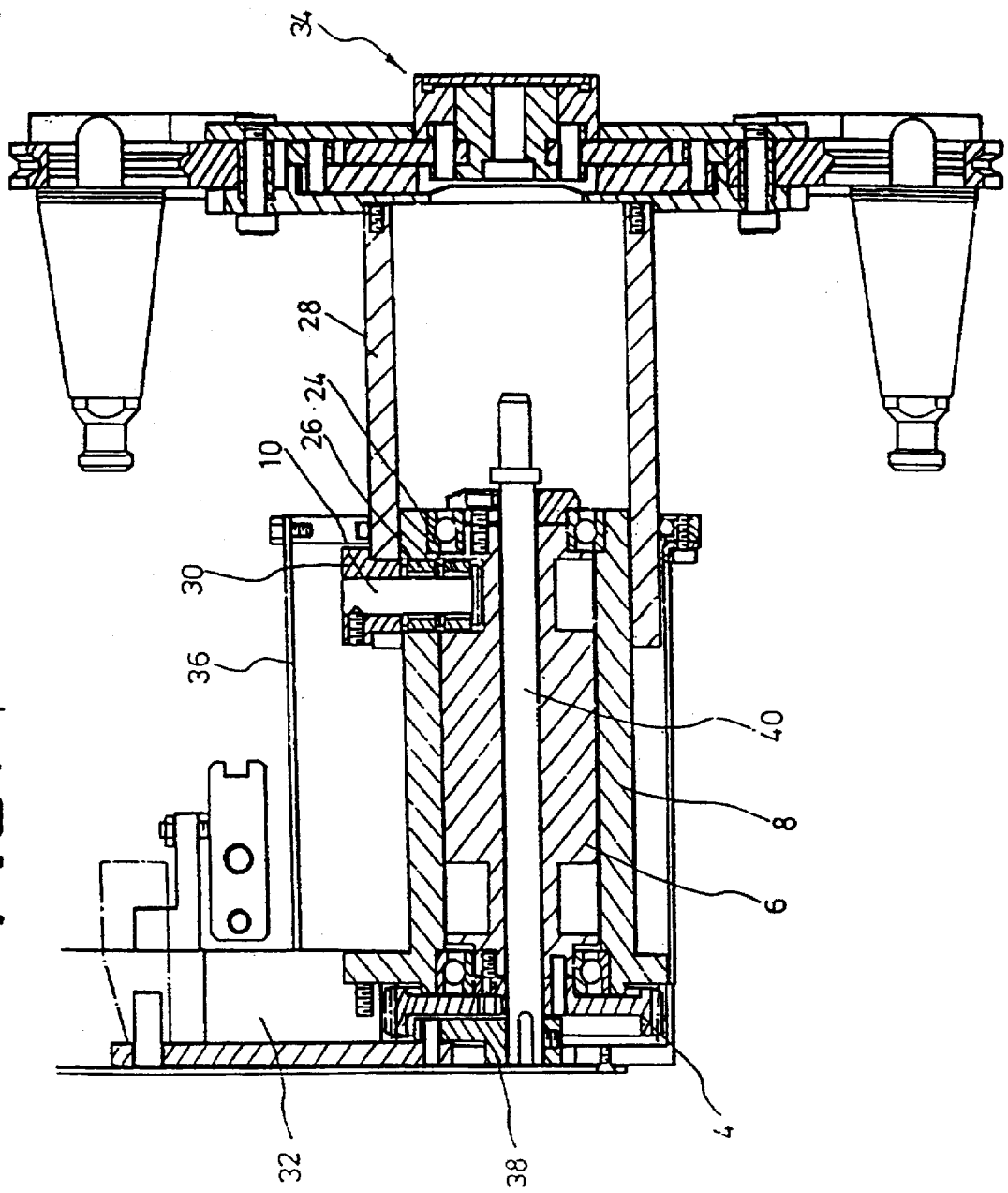
FIG. 4 is a view similar to FIG. 1 but illustrating the clamp means moved forward.

When the driven gear 4 rotates the first cam 6 positioned as shown in FIG. 1, the pin 10 moves along the first oblique branch 14 of the first cam 6 toward the right side of the drawing. Accordingly, the moveable member 28 is moved together, as shown in FIG. 4, because the moveable member 28 is fixedly attached to the ring-shaped block 30 joined with the pin 10. In this case, the pin 10 is prevented from rotating until it reaches the vertical branch 22 of the second cam 8 which is fixedly mounted on the frame 32. Reaching the vertical branch 22 of the second cam 8 at the end of the first horizontal branch 18, the pin 10 is guided from the upper end to the lower end of the vertical branch 22, so that the moveable member 28 is rotated by 180° and thus the clamp device 34 because the vertical branch 22 has a length being half the circular perimeter of the second cam 8. The pin 10 is kept at the connecting point 12 of the drive cam groove of the first cam 6 until reaching the lower end of the vertical branch 22 of the second cam 8.

Thereafter, as the drive gear 2 keeps on running, the pin 10 is driven backward by the second oblique groove 16 of the first cam 16, so that the moveable member 28 with the clamp device 34 is moved to the initial position along the second horizontal branch 20 of the second cam 8. Thus, a single drive source is employed to horizontally move and rotate the clamp device 34.

What is claimed is:

1. A tool change apparatus for changing the tools of a machining center, comprising:

a frame for mounting said tool change apparatus;

a cam follower means;

a cylindrically shaped moveable member fixedly connected with said cam follower means for moving a clamp means fixedly attached to the free end of said moveable member;

a first cylindrically shaped cam rotatably mounted on a shaft mounted on said frame;

a second cylindrically shaped cam fixedly mounted on said frame;

a drive means for rotating said first cam;

a drive cam groove formed in the side surface of said first cam for driving said cam follower means; and a guide cam groove formed in the side surface of said second cam for guiding said cam follower means, wherein said first cam is snugly fitted into said second cam which is snugly fitted into said moveable member, and said drive and guide cam grooves cooperate to move said cam follower means and said moveable member to a position for changing said tools when said first cam is rotated in a direction.

2. A tool change apparatus as defined in claim 1, wherein said drive cam groove comprises two branches formed at an angle to the axis of said shaft, the branches intersecting at a connecting point near a front end of said first cam toward the direction of said clamp means, and wherein said guide cam groove comprises two parallel, axially-extending branches and a circumferentially-extending branch joining the parallel branches at one end thereof, the circumferentially-extending branch being aligned with said connecting point.

3. A tool change apparatus as defined in claim 2, wherein the length of said circumferentially-extending branch is one-half the circular perimeter of said second cam, so that when said cam follower means is guided from the upper end to the lower end of said circumferentially-extending branch, said moveable member is rotated by approximately b 180°.

4. A tool change apparatus as defined in any of the above claims, wherein said cam follower means consists of a pin inserted in said drive and guide cam grooves, a ring-shaped block for fixedly connecting said moveable member with one end part of said pin, and a pair of rollers for surrounding the other end part of said pin, said rollers being respectively positioned in said fdrive and guide grooves so as to help the movement of said pin in said grooves.

* * * * *

UNITED STATES PATENT AND TRADEMARK OFFICE
CERTIFICATE OF CORRECTION

PATENT NO. : 5,684,369
DATED : November 4, 1997
INVENTOR(S) : Dongyoon Kim

It is certified that error appears in the above-identified patent and that said Letters Patent is hereby corrected as shown below:

Claim 3, column 4, line 32, "approximately b 180°." should read --approximately 180°.--.

Claim 4, column 4, line 40, "fdrive" should read --drive--.

Signed and Sealed this

Fifth Day of May, 1998

Attest:

BRUCE LEHMAN

*Attesting Officer*      *Commissioner of Patents and Trademarks*